United States Patent Office 3,743,720
Patented July 3, 1973

3,743,720
DRY WATER-DISPERSIBLE ALUMINUM HYDROXIDE GELS
Alan Philip Fosker, Loudwater High Wycombe, and Patrick James Mill, Beaconsfield, England, assignors to Miles Laboratories Incorporated, Elkhart, Ind.
No Drawing. Filed Aug. 1, 1969, Ser. No. 846,926
Claims priority, application Great Britain, Aug. 20, 1968, 39,876/68
Int. Cl. A61k 23/00
U.S. Cl. 424—88                4 Claims

ABSTRACT OF THE DISCLOSURE

Dry, water-dispersible preparations of antibody-producing or immunizing substances such as allergens, with aluminum hydroxide gels adsorbed thereon produced by a process of freeze-drying a suspension of the gel in the presence of polyhydric alcohols.

---

This invention relates to the preparation of dry, water-dispersible aluminum hydroxide gels having antibody-producing or immunizing substances adsorbed thereon.

It is known that antibody-producing or immunizing substances (hereinafter called the active substance) such as antigens, allergens, microorganisms, microbial products, toxins and toxoids have enhanced activity when adsorbed on aluminum hydroxide gels and used as suspensions thereof. The enhanced activity of such gels (which are sometimes called "alum-precipitated" as they are often made by addition of alum to a basic solution or suspension of the active substance) is believed to be due to the adsorption of active substance on to the alumina gel, and the resulting slow release of the active substance into the system of the patient being immunized or hyposensitized.

Preparations of this kind are commonly dispensed as aqueous suspensions, but these suspensions have certain disadvantages. In the first place, the suspension of gel tends to settle on standing with the result that insufficient mixing before use can lead to administration of an incorrect dose. Secondly, liquid preparations are liable to leakage and contamination. Thirdly, suspended aluminum hydroxide gels tend, after standing some time, to adhere to the sides of the container in which they are placed, and this makes it difficult to dispense the gels in small amounts and low concentrations. Fourthly, the active substances used in the present invention are in general labile materials which are best preserved at low temperatures when in the presence of water, but normal aqueous suspensions are destroyed by freezing so that care is necessary to refrigerate the gel suspensions without freezing them.

These disadvantages can be avoided by preparing the aluminum hydroxide gel in the dry state, but it is not sufficient simply to dry the aluminum hydroxide gel having the active substance adsorbed thereon, as this destroys the gelatinous nature of the adsorbent, and may also adversely affect the activity of the adsorbed material.

The present invention provides a process for the preparation of a dry, water-dispersible aluminum hydroxide gel having an active substance adsorbed thereon, which comprises freeze-drying a suspension of an aluminum hydroxide gel having an active substance adsorbed thereon in an aqueous solution of a water-soluble, non-toxic and substantially non-volatile polyhydric alcohol containing at least three hydroxyl groups per molecule or of a water-soluble, non-toxic polymer, the amount of the said polyhydric alcohol or polymer being from 2 to 200 times, and preferably from 5 to 50 times the weight of the aluminum hydroxide gel. Dried aluminum hydroxide gels prepared in this manner are easily stored and transported. They are stable at room temperature so that refrigeration is unnecessary and their shelf life is prolonged. They are not susceptible to attack by microbes, and their transport is facilitated since they weigh less (for a given quantity of active substance) than previously used suspensions. They are readily dispersed in sterilized water before injection at the time of use.

The aluminum hydroxide gel having active substance adsorbed thereon may be any known preparation of this type, e.g. a gel made by precipitation with alum of an aqueous pyridine extract of an antigenic material, as described and claimed in U.S. Pat. Nos. 3,148,121 and 3,148,122 and sold under the trade name Allpyral®. A second and more common type of gel is that produced by the addition of aluminum ion to a strictly aqueous extract or solution of an antigen, allergen, microorganism, microbial product, toxic or toxoid. Such alum-precipitated active substances were first disclosed by Glenny et al. in the Journal of Pathology and Bacteriology, 29:31, 1926, which publication described the increased antigenicity of a diphtheria toxin or toxoid gel. Later this alum precipitation or gel adsorption technique was extended to other antigens and allergens.

Such aluminum hydroxide gels are usually prepared by adding aluminum ions to a solution of the antibody-producing substance and adjusting the pH of the solution until aluminum hydroxide is formed and precipitates from solution, either occluding or adsorbing the antibody-producing substance, and thus retarding its release into the body on subsequent administration. Another method involves the direct addition of preformed aluminum hydroxide gel or suspension to a solution of the antibody-producing substance.

The stabilized aluminum hydroxide gels having antibody-producing substance adsorbed thereon are used in exactly the same manner as the prior art preparations but without fear of elution of the active component from the gel. Such prior art use is described in the aforementioned U.S. Pats Nos. 3,148,121 and 3,148,122 and generally comprises the use of a larger and less frequent dose of the antibody-producing substance than would be used if such an active substance was dissolved in an appropriate solvent. Generally speaking, the suspension subjected to freeze-drying contains from 0.1 to 5% by weight of aluminum hydroxide gel.

The polyhydric alcohol or water-soluble polymer used must not, of course, itself be antigenic, allergenic or toxic.

Suitable polyhydric alcohols containing at least 3 hydroxyl groups per molecule include glycerol, mannitol, sorbitol and sugars such as glucose and sucrose. It is also possible to use water-soluble, non-toxic polymers, preferably plasma extenders, such as polyvinylpyrrolidone and dextran.

The freeze-drying is carried out in conventional manner.

The following example illustrates the invention.

EXAMPLE

One (1) ml. of a 10% solution of mannitol was added to 1 ml. of a suspension of aluminum hydroxide gel having tree pollen antigen adsorbed thereon and containing 2.3 mg. of aluminum hydroxide per ml. (The suspension of aluminum hydroxide gel was a pyridine extracted-alum precipitated mixed tree pollen sold under the trade name Allpyral® Tree Mix, and contained 10,000 protein nitrogen units per ml.). The mixture was frozen in an ampoule by immersion in a solid carbon dioxide/acetone bath, with rotation of the ampoule to spread the frozen mixture over the whole of the interior. The ampoule was then evacuated and the contents allowed to dry in vacuo in the normal manner of freeze-drying. The dried product was a powdery porous solid having the color of the original preparation. On addition of 1 ml. of water and gentle agitation, a suspension was obtained which was indistinguishable in appearance from the original Allpyral® suspension.

Exactly the same result could be obtained if the Allpyral® Tree Mix suspension was replaced by Allpyral® Grass Mix suspension or Allpyral® Nettle Pollen suspension. The mannitol can be replaced by sorbitol, glycerol, glucose, sucrose or polyvinyl-pyrrolidone.

What is claimed is:

1. In a process for freeze drying an aqueous suspension containing about from 0.1% to 5% of an aluminum hydroxide gel having an antibody producing substance selected from the group consisting of antigens, allergens, micro-organisms, microbial products, toxins and toxoids adsorbed thereon, the improvement which comprises adding to said suspension prior to subjecting the same to freeze drying, a polyhydric alcohol selected from the group consisting of glycerol, sorbitol and mannitol, the weight of said polyhydric alcohol in said suspension being 2 to 200 times the weight of said gel.

2. A process according to claim 1 in which the weight of the said polyhydric alcohol is 5 to 50 times the weight of the said gel.

3. A process according to claim 1 in which the gel is one made by precipitation with alum of an aqueous pyridine extract of an antigenic material.

4. The product prepared by the process of claim 1.

References Cited

UNITED STATES PATENTS

| | | | |
|---|---|---|---|
| 2,879,202 | 3/1959 | Aiston et al. | 424—89 |
| 2,908,614 | 10/1959 | Muggleton et al. | 424—89 |
| 3,075,883 | 1/1963 | Scherr et al. | 424—91 |
| 3,148,121 | 9/1964 | Strauss | 424—88 |
| 3,148,122 | 9/1964 | Strauss | 424—91 |
| 3,177,117 | 4/1965 | Saunders | 424—80 |
| 3,183,161 | 5/1965 | McLean, Jr., et al. | 424—89 |
| 3,429,965 | 2/1969 | Gelenczei et al. | 424—89 |

FOREIGN PATENTS

| | | | |
|---|---|---|---|
| 969,432 | 9/1964 | Great Britain | 424—89 |

ALBERT T. MEYERS, Primary Examiner

F. E. WADDELL, Assistant Examiner

U.S. Cl. X.R.

424—80, 89, 91, 92, 93